United States Patent [19]

Allen

[11] Patent Number: 5,649,210

[45] Date of Patent: Jul. 15, 1997

[54] COMMUNICATION INTERFACE CIRCUIT HAVING NETWORK CONNECTION DETECTION CAPABILITY

[75] Inventor: Charles M. Allen, Sunnyvale, Calif.

[73] Assignee: Maxim Integrated Products, Sunnyvale, Calif.

[21] Appl. No.: 315,130

[22] Filed: Sep. 29, 1994

[51] Int. Cl.$^6$ ................................................ G06F 1/32
[52] U.S. Cl. ........................................ 395/750; 340/425.2
[58] Field of Search ....................... 326/62–92; 364/707; 395/750; 340/425.2

[56] References Cited

U.S. PATENT DOCUMENTS

| | | | |
|---|---|---|---|
| 3,586,992 | 6/1971 | Garfein et al. | 331/17 |
| 4,839,917 | 6/1989 | Oliver | 379/45 |
| 5,095,450 | 3/1992 | Shakra et al. | 395/114 |
| 5,121,342 | 6/1992 | Szymborski et al. | 395/514 B |
| 5,260,612 | 11/1993 | Lehmann et al. | 326/68 |
| 5,327,463 | 7/1994 | Matsumoto | 375/317 |
| 5,446,404 | 8/1995 | Badyal et al. | 327/143 |
| 5,481,194 | 1/1996 | Schantz et al. | 324/522 |

Primary Examiner—Gopal C. Ray
Assistant Examiner—Paul R. Myers
Attorney, Agent, or Firm—Blakely, Sokoloff, Taylor & Zafman LLP

[57] ABSTRACT

A method and apparatus for interfacing a computer system with another system is described including an interface circuit. The interface circuit detects if the voltage level on a signal line represents a valid logic level and if so, provides a valid signal in response. The valid signal allows the computer system to which the interface circuit is coupled to provide power to the interface circuit such that network communication may be established and the interface circuit can internally turn on and off sections of its circuitry without intervention or control by the computer system. In addition, the computer system can use the Invalid signal to control software and/or to notify the user of the status of the computer system. When the interface circuit detects that the voltage level on the signal line does not represent a valid logic level, an Invalid signal is provided allowing the application of power to certain portions of the interface circuit to be suspended so that overall power consumption by the computer system is reduced.

27 Claims, 2 Drawing Sheets

COMMUNICATION INTERFACE CIRCUIT HAVING NETWORK CONNECTION DETECTION CAPABILITY

BACKGROUND OF THE INVENTION

1. Field of the Invention

The present invention relates generally to the field of digital communications. More particularly, the invention relates to a communications interface circuit which detects if it is connected to a network or another communications system and which facilitates the reduction of overall power consumption when the interface circuit detects that it is not thus connected.

2. Related Art

Various communication interface standards are known for establishing connections between computer systems and peripheral devices. One example of such an interface is the RS-232 serial communication interface standard which is used in many applications, including IBM compatible personal computers. Conventionally, the circuitry used to provide a computer system with RS-232 communication interface capability remains active and powered even when not connected to a device. In the past, when computer systems were generally powered via a standard electrical outlet, this constant utilization of power did not present a problem because of the virtually inexhaustible supply of power available.

However, with the recent popularity of portable laptop and palmtop computers, which generally draw power from a rechargeable battery, this unnecessary power consumption has become problematic. Without a check on the status of its connection to other systems, the unused interface circuitry continues to drain power from the rechargeable battery, thereby reducing the amount of time the portable computer system may be used remotely.

To reduce this unnecessary power consumption, and thereby extend the time the rechargeable battery remains charged, it is desirable to provide a communication interface circuit which detects when it is not coupled to another communications system, and which provides a signal in response so that the application of power to certain portions of the interface circuit can be suspended.

SUMMARY OF THE INVENTION

A method and apparatus for providing network communications capability to a computer system is described, including an interface circuit. The interface circuit detects if it is coupled to a network or communications system and provides a valid signal if it is thus coupled. This permits the computer system to which the interface circuit is coupled to provide power to the interface circuit so that communications may be established. The interface circuit can internally turn on and off sections of its circuitry without intervention or control by the computer system. When the interface circuit is not coupled to a network or another communications system, an Invalid signal is asserted so that the application of power to certain portions of the interface circuit can be suspended, thereby reducing the overall power consumption of the computer system. In addition, the computer system can use the Invalid signal to control software and/or notify the user of the status of the computer system.

The interface circuit includes a set of subcircuits coupled to data and control signal lines. These subcircuits monitor the voltage level on the control signal and data lines to determine if they are inactive. The outputs of the subcircuits are logically AND'ed together and fed through a monostable circuit so that when invalid signal levels are present on all the signal lines for a predetermined period of time, a Master Invalid Signal is asserted, indicating that the interface circuit is not coupled to a network or communication system.

BRIEF DESCRIPTION OF THE DRAWINGS

The objects, features and advantages of the present invention will become apparent from the following detailed description of the present invention in which.

DETAILED DESCRIPTION OF THE INVENTION

A description of an interface circuit which determines whether it is coupled to a network or another communications system is provided. In this description, various signals, voltage levels and circuits are described in detail. It will be obvious to one skilled in the art that these details are not necessary in order to practice the present invention. This is done in order to avoid unnecessarily obscuring the disclosure of the present invention.

Figure 1:
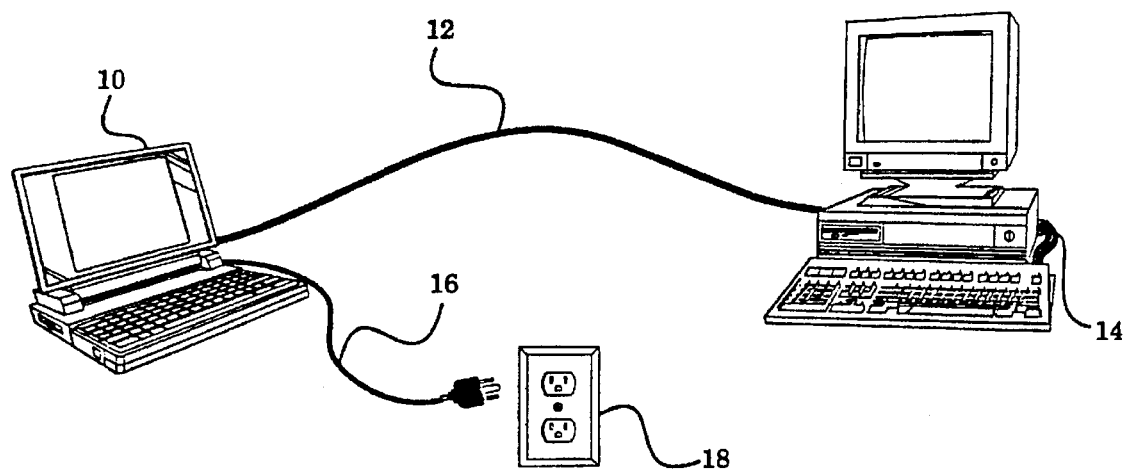
FIG. 1 is an illustration of a laptop computer communicating with a desktop personal computer in accordance with one embodiment of the invention.

FIG. 1 is an illustration of a laptop computer system coupled to a desktop computer system by a cable in accordance with one embodiment of the invention. It is understood that the computer system may be similarly coupled to a network or other devices such as a modem or test equipment. When inserted into outlet 18, power cable 16 provides power to computer system 10 allowing laptop computer system 10 to transmit and receive data over interface cable 12 from desktop computer system 14. Laptop computer system 10 is designed for portability with an internal battery (not shown) that allows interface cable 12 and power cable 16 to be decoupled from laptop computer system 10 so that the laptop computer system 10 can be used as an isolated unit when external power is not available.

Figure 2:
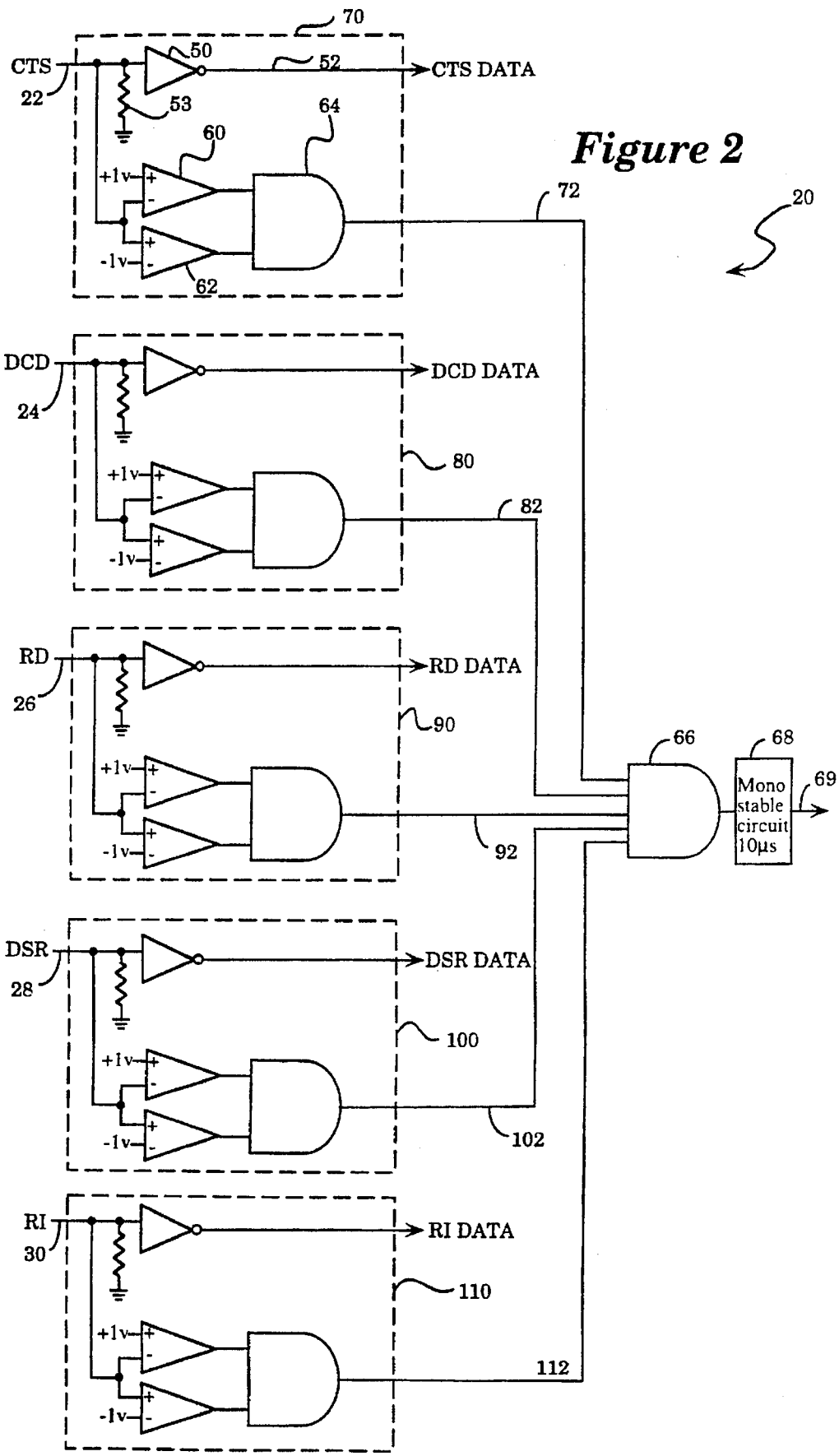
FIG. 2 is a circuit diagram illustrating an interface circuit configured in accordance with the described embodiment of the invention.

FIG. 2 is a circuit diagram illustrating an interface circuit 20 used by computer system 10 when configured in accordance with one embodiment of the invention. In a preferred embodiment, interface circuit 20 is located on a circuit card within the computer system 10. The interface circuit 20 comprises a plurality of control line interface circuits 70, 80, 90, 100 and 110, an AND gate 66 and a monostable circuit 68. The control line interface circuits 70, 80, 90, 100 and 110 are identical and each circuit 70, 80, 90, 100, 110 receives an control signal line which indicates the status of data flow between the computer system 10 and desktop computer system 14 via interface cable 12. In the present embodiment, control line interface circuits 70, 80, 90, 100, 110 receive data via Clear to Send (CTS) line 22, Carrier Detect (CD) line 24, Receive Data (RD) line 26, Data Set Ready (DSR) line 28 and Ring Indicator (RI) line 30 respectively. CTS line 22, CD line 24, RD line 26, DSR line 28 and RI line 30 are part of the RS-232 communications interface standard and are embodied as individual wires in interface cable 12. In response, each circuit 70, 80, 90, 100, 110 generates a Single line Invalid signal on signal lines 72, 82, 92, 102, 112 respectively, which indicates whether each control line interface circuit 70, 80, 90, 100, 110 is connected to a network or another communications device such as desktop computer system 14 or a modem (not shown). Each signal line 72, 82, 92, 102, 112 is provided as an input to AND gate 66. The AND gate 66 provides an output to monostable circuit 68 which in turn generates a Master Invalid signal on line 69. The Master Invalid signal indicates if the entire interface circuit 20 is not connected to a network or another device, and may be used by the computer to regulate power to the device.

In particular, when each of the control lines 22, 24, 26, 28 and 30 that make up the RS-232 interface are at invalid voltage levels, it may be inferred that no communications system or network is coupled to the interface circuit 20. When all the control line interface circuits 70, 80, 90, 100 and 110 experience invalid logic levels on their respective control signal lines 22, 24, 26, 28, 30, the set of logic high Single Line Invalid signals generated in response on signal lines 72, 82, 92, 102 and 112 cause AND gate 66 to assert a Master Invalid signal to monostable circuit 68. Monostable circuit 68 maintains the present state of the output signal on line 69 until the new signal asserted by AND gate 66 remains the same for a predetermined period of time. In the present preferred embodiment, this predetermined period of time is 10 microseconds (μs).

By maintaining the present state of line 69 until the signal asserted by AND gate 64 remains stable for at least 10 μs, monostable circuit 68 prevents the Master Invalid signal from being asserted in response to any temporary conditions that might falsely indicate that no device is coupled to the RS-232 interface circuit. Such temporary conditions may be created when simultaneous transitions across all the RS-232 signal lines cause all the signals to temporarily be at invalid voltage levels. However, since these signals only remain at an invalid logic level for substantially less than 10 μs, monostable circuit 68 effectively prevents false Master Invalid signals from being asserted in response to these temporary conditions. Monostable circuits that utilize time periods other than 10 μs are also contemplated, with the proper time period easily being determined through experimentation on a network configured in accordance with a particular network standard. Thus, the circuit configured as described above allows for reduced power consumption, while also reducing the likelihood of false Invalid signals being generated as a result of simultaneous transitions occurring across all the signal lines that make up the RS-232 interface.

As discussed earlier, the control line interface circuits 70, 80, 90, 100, 110 are identical and each receives data provided via a control signal line embodied within interface cable 12. For present purposes, a description of control line interface circuit 70, which is representative of control line interface circuits 80, 90, 100, 110, will be provided. The control line interface circuit 70 comprises an inverter 50, two voltage comparators 60, 62 and an AND gate 64. In an alternate embodiment, control line interface circuit 70 comprises the voltage comparators 60, 62 and an AND gate 64. In this alternate embodiment, voltage comparator 60 may be configured to perform the function of inverter 50. Alternatively, voltage comparator 62 may be configured to perform the function of inverter 50. In a further embodiment, control line interface circuit 70 comprises the voltage comparators 60, 62. In this embodiment, the outputs of comparators 60, 62 are provided directly to AND gate 66. Within the control line interface circuit 70, inverter 50 detects the voltage level on the CTS line 22, and asserts the appropriate logic level on an internal CTS data line 52 in response. A resistor 53 is coupled between ground and the CTS line 22. In a preferred embodiment, resistor 53 has a value of 5 Ω. Voltage comparator circuit 60 has its inverting input coupled to CTS line 22, and its non-inverting input coupled to a positive one volt (+1 V) voltage source. The non-inverting input of voltage comparator 62 is coupled the CTS line 22 and the inverting input is coupled to a negative one volt (−1 V) voltage source. The outputs of voltage comparator 60 and 62 are coupled to the inputs of AND gate 64, which generates a Single Line Invalid signal on line 72. If the control line interface circuit 70 is coupled to another device, the Single Line Invalid signal is deasserted. Conversely, if the control line interface circuit 70 is not coupled to another device, the single line Invalid signal is asserted, as will be described in detail below. In a further alternate embodiment, the voltage asserted on CTS data line 52 may be determined by sensing the current through resistor 53. The Single Line Invalid signal is applied to AND gate 66 via line 72. Monostable circuit 68 is coupled to the output of AND gate 66 and produces a Master Invalid signal on line 69. As discussed earlier, control line interface circuits 80, 90, 100 and 110 are identical to control line interface circuit 70, with each circuit 80, 90, 100 and 110 also applying its Single Line Invalid signal via lines 82, 92, 102 and 112, respectively, to AND gate 66.

Figure 3:
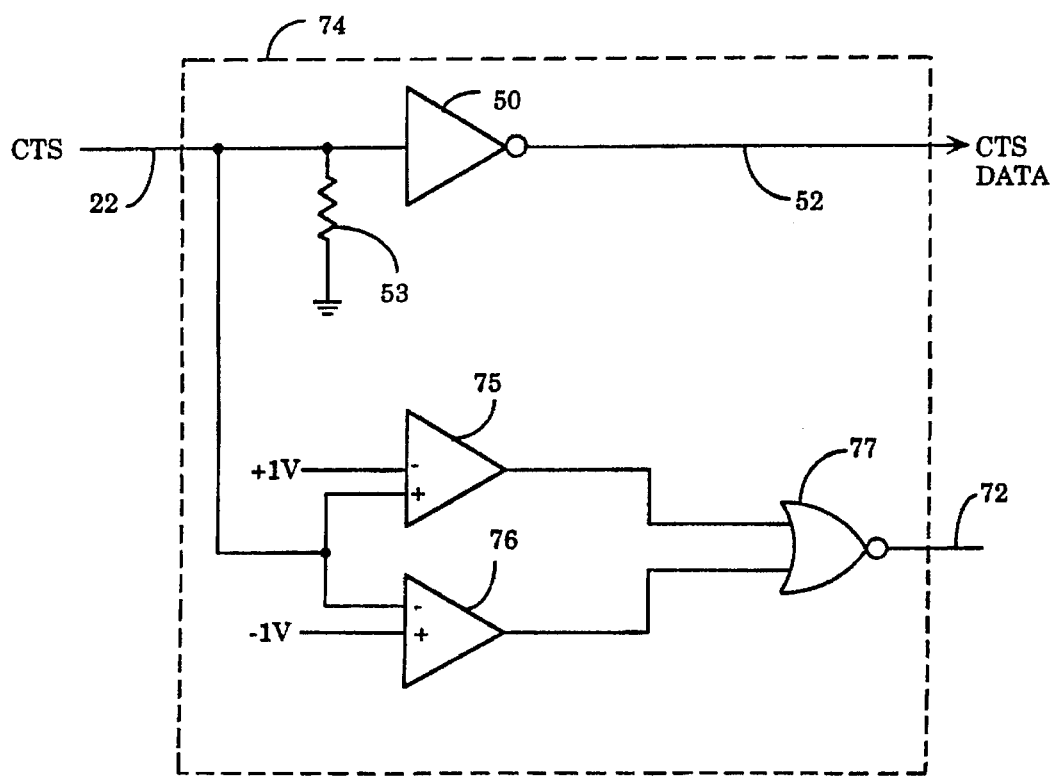
FIG. 3 is a circuit diagram illustrating an alternative embodiment of a control line interface circuit in accordance with the invention.

FIG. 3 illustrates an alternate embodiment of control line interface circuit 70. The interface circuit 74 comprises an inverter 50, voltage comparators 75, 76 and a NOR gate 77. Inverter 50 operates identically to the inverter 50 in interface circuit 74. Resistor 53 is coupled between ground and the CTS line 22. Voltage comparator 75 has its non-inverting input coupled to CTS line 22, and its inverting input coupled to a positive 1 Volt (+1.0 volt) voltage source. The inverting input of voltage comparator 76 is coupled to CTS line 22, while the non-inverting input is coupled to a negative 1 volt (−1.0 volt) voltage source. The outputs of voltage comparators 75 and 76 are connected to NOR gate 77, which generates a single line Invalid signal on line 72. Other control line interface circuits 80, 90, 100, 100 may be similarly implemented.

When laptop computer system 10 and desktop computer 14 are communicating with each other over interface cable 12 (FIG. 1), the voltage used to transmit data over the CTS line 22 will generally vary between positive three (+3.0) volt or greater, and negative three (−3.0) volt or less. These are the voltage levels required to assert a valid signal under the RS-232 interface standard. The presence of these valid voltage levels on the CTS line 22 cause inverter 50 to assert the appropriate logic signal on internal data line 52 for use internally by computer system 10. Each of the other control line interface circuits 80, 90, 100 and 110 perform similarly in response to voltage levels present on their respective input signal lines, and the combination of all the control line interface circuits form the input portion of standard RS-232 communication interface.

While inverter 50 of control line interface circuit 70 is driving internal data line 52, voltage comparators 60 and 62 of control line interface circuit 70 are also monitoring the voltage level on the CTS line 22. When the voltage level on the CTS line 22 is greater than −1.0 volt, the voltage level on the non-inverting input of voltage comparator 62 will be greater than the voltage level on its inverting input. This causes voltage comparator 62 to apply a logic high to AND gate 64. When the voltage level on the CTS line 22 is less than +1.0 volt, the voltage level on the inverting input of voltage comparator 60 will be less than the voltage level on its non-inverting input. This causes voltage comparator 60 to apply a logic high to AND gate 64. Thus, when the voltage level on the CTS line 22 is between −1.0 and +1.0 volts, which is the voltage level associated with an invalid logic level, voltage comparator 62 and voltage comparator 60 will both simultaneously assert logic highs, which in turn will cause AND gate 64 to assert a Single Line Invalid signal that is applied to AND gate 66. Monostable circuit 68 maintains the present state of the output signal on line 69 until the new signal asserted by AND gate 66 remains the same for at least 10 μs.

As discussed earlier, the control line interface circuit 74 may be used in place of the interface circuit 70 in implementing the present invention. When the voltage level on the CTS line 22 is less than +1.0 volt, voltage comparator 75 will provide a low logic output since the voltage level on the non-inverting input of comparator 75 will be less than the voltage level on its inverting input. This causes voltage comparator 75 to apply a logic low to NOR gate 77. When the voltage level on the CTS line 22 is greater than −1.0 volt, the voltage level on the inverting input of voltage comparator 76 will be greater than the voltage level on its non-inverting input. This causes voltage comparator 76 to apply a logic low to NOR gate 77.

Assuming that A and B are the output comparators 75 and 76 respectively, and C is the output of NOR gate 77, then $$C = \overline{A+B} = \overline{A}\overline{B}$$

and
if
A=0
B=0
C=1
and the output of NOR gate 77, as provided on line 72, will be a logic high signal, corresponding to a voltage level on the CTS line 22 that is between +1.0 and −1.0 volts.

Thus, the described interface circuit 20 will assert a logic high on line 69 that can be used by computer system 10 to suspend the application of power applied to certain portions of the described interface circuit used to receive and transmit information in accordance with the RS-232 interface standard. The portions of the described interface circuit to which the power is suspended as well as other circuits used to provide interface capability such as the transmitter circuit, which are well known in the art, but not shown in order to avoid unnecessary complicating the disclosure of the invention. By suspending the application of power to certain portions of the described interface circuit, the total power consumed by computer system 10 of FIG. 1 is reduced, thus extending the life of the rechargeable battery used to provide power.

Thus, a method and apparatus for networking a computer system that allows for reduced power consumption is described. While the invention is described in the context of an RS-232 compatible circuit, the invention can also be utilized with other communication standards and interfaces that use voltage level transitions over signal lines to transmit data. The computer system 10 can also utilize the present invention to further control power in response to the Invalid signal. Additionally, while the invention is shown used within a portable computer system, it can be included any communications system that would benefit from reduced power consumption. The interface circuit can also internally turn on and off sections of its circuitry without intervention or control by the computer system 10. Furthermore, the computer system 10 can use the Invalid signal to indicate to the user, or to other software, whether or not the computer system 10 is connected to an active network, communications system, or other communications device. The specific embodiment set forth above is intended merely to demonstrate one implementation of the invention and should not be viewed as limiting its scope. Other implementations and embodiments of the invention will be readily apparent to those skilled in the art.

What is claimed is:

1. A communications interface circuit comprising:
   means for detecting the presence of a signal that is at a level associated with an Invalid logic signal;
   means for providing a Master Invalid signal in response to said means for detecting; and
   monostable means for generating a Stabilized Master Invalid signal in response to said means for providing, said Stabilized Master Invalid signal is (i) asserted if said Master Invalid signal remains in the invalid state for a predetermined period of time, and (ii) deasserted if said Master Invalid signal remains in the invalid state for less than said predetermined period of time.

2. The communications interface circuit as set forth in claim 1, wherein said means for detecting comprises:
   first means for determining the presence of said signal that is below a first level; and
   second means for determining the presence of said signal that is above a second level.

3. The communications interface circuit as set forth in claim 2, further comprising:
   AND gate means for providing an Invalid signal between a third and a fourth level in response to said first means for determining and said second means for determining.

4. The communications circuit set forth in claim 3, further comprising:
   second means for detecting the presence of a second signal that is at a level associated with a second Invalid logic signal; said second means comprising:
      third means for determining the presence of said second signal that is below said first level;
      fourth means for determining the presence of said second signal that is above said second level; and
      second AND gate means for providing a second Invalid signal responsive to said third means for determining and said fourth means for determining.

5. The communications interface circuit as set forth in claim 4, wherein:
   said means for providing said Master Invalid signal asserts said Master Invalid signal in response to said first Invalid signal and said second Invalid signal.

6. The communications interface circuit as set forth in claim 2, further comprising:
   means for generating a data signal in response to said first signal being above a third level and below a fourth level.

7. The communications interface circuit as set forth in claim 6, wherein said means for generating the data signal is said first means for determining the presence of said signal that is below the first level.

8. The communications interface circuit as set forth in claim 6, wherein said means for generating the data signal is said second means for determining when said signal is above a second level.

9. The communications interface as set forth in claim 2, wherein:

said first and second levels are voltage levels.

10. The communications interface circuit as set forth in claim 1, wherein the level associated with the Invalid logic signal is within a range.

11. A communications interface circuit comprising:

an Invalid signal detection circuit detecting the presence of a signal that is at a level associated with an Invalid logic signal;

an Invalid signal generation circuit providing a Master Invalid signal in response to said Invalid signal detection circuit; and a monostable circuit generating a Stabilized Master Invalid signal in response to said Invalid signal generation circuit, said Stabilized Master Invalid signal is (i) asserted if said Master Invalid signal remains in the invalid state for a predetermined period of time, and (ii) deasserted if said Master invalid signal remains in the invalid state for less than said predetermined period of time.

12. The communications interface as set forth in claim 11, wherein said Invalid signal detection circuit comprises:

a first comparator determining the presence of said signal that is below a first level; and a second comparator determining the presence of said signal that is above a second level.

13. The communications circuit as set forth in claim 12, further comprising:

an AND gate providing an Invalid signal between a third and a fourth level in response to said first comparator and said second comparator.

14. The communications interface circuit set forth in claim 13, further comprising:

a second Invalid signal detection circuit detecting when a second signal is at a level associated with a second Invalid logic signal; said second Invalid signal detection circuit comprising:

a third comparator determining the presence of a second signal that is below said first level;

a fourth comparator determining the presence of said second signal that is above said second level; and a second AND gate providing a second Invalid signal responsive to said third comparator and said fourth comparator.

15. The communications interface circuit as set forth in claim 14, wherein:

said Invalid signal generation circuit provides said Master Invalid signal in response to said first Invalid signal and said second Invalid signal.

16. The communications interface circuit as set forth in claim 13, further comprising:

data comparator generating a data signal in response to said first signal being above a third level and below a fourth level.

17. The communications interface as set forth in claim 16, wherein said data comparator is said first comparator.

18. The communications interface as set forth in claim 16, wherein said data comparator is said second comparator.

19. The communications interface circuit as set forth in claim 11, wherein:

said first and second levels are voltage levels.

20. The communications interface circuit as set forth in claim 11, wherein the level associated with the Invalid logic signal is within a range.

21. A method for interfacing two communications systems comprising the steps of:

a) detecting the presence of a signal that is at a level associated with an Invalid logic signal;

b) providing a Master Invalid signal in response to step a); and c) generating a Stabilized Master Invalid signal in response to step b), said generating step includes the steps of c.1) asserting said Stabilized Master Invalid signal if said Master Invalid signal remains in the invalid state for a predetermined period of time, and alternatively c.2) deasserting said Stabilized Master Invalid signal if said Master Invalid signal remains in the invalid state for less than said predetermined period of time.

22. The method as set forth in claim 21, wherein step a) comprises steps of:

a.1) determining the presence of said signal that is below a first level;

a.2) determining the presence of said signal that is above a second level; and a.3) providing an Invalid signal in response to steps a.1) and a.2).

23. The method set forth in claim 22, further comprising the steps of:

d) determining the presence of a second signal that is below the first level;

e) determining the presence of said second signal that is above the second level; and f) providing a second Invalid signal in response to step d) and step e), said Invalid signal in step a.3) being a first Invalid signal.

24. The method as set forth in claim 23, wherein:

step b) is performed in response to said first Invalid signal and said second Invalid signal.

25. The method as set forth in claim 24, further comprising the step of:

generating an internal signal between a third level and a fourth level in response to the first signal being below said first level and above said second level.

26. The method as set forth in claim 20, wherein:

said first and second levels are voltage levels.

27. The method as set forth in claim 21, wherein the level associated with the Invalid logic signal is within a range.

* * * * *

(12) REEXAMINATION CERTIFICATE (4445th)
United States Patent
Allen

(10) Number: US 5,649,210 C1
(45) Certificate Issued: Sep. 18, 2001

(54) COMMUNICATION INTERFACE CIRCUIT HAVING NETWORK CONNECTION DETECTION CAPABILITY

(75) Inventor: Charles M. Allen, Sunnyvale, CA (US)

(73) Assignee: Maxim Integrated Products, Sunnyvale, CA (US)

Reexamination Request:
No. 90/005,932, Feb. 20, 2001

Reexamination Certificate for:
Patent No.: 5,649,210
Issued: Jul. 15, 1997
Appl. No.: 08/315,130
Filed: Sep. 29, 1994

(51) Int. Cl.[7] .................................................... G06F 1/32
(52) U.S. Cl. ...................................... 713/320; 340/425.2
(58) Field of Search ....................... 326/62–92; 713/300, 713/320, 310; 340/425.2; 710/126, 129, 130

(56) References Cited

U.S. PATENT DOCUMENTS

| | | |
|---|---|---|
| 3,586,992 | 6/1971 | Garfein . |
| 3,831,091 | 8/1974 | Kanitz et al. . |
| 3,955,102 | 5/1976 | Chi . |
| 4,807,249 | 2/1989 | Lang et al. . |
| 5,331,672 | 7/1994 | Evans et al. . |

OTHER PUBLICATIONS

Murdock, Gary and Goldie, John; Build a Direction–Sensing Bidirectional Repeater; Electronic Design, May 11, 1989, pp. 105–108 and 110.

Murdock, Gary and Goldie, John; Build a Direction–Sensing Bidirectional Repeater; National Semiconductor Application Note, May 1990, pp. 1–6.

(Anonymous) IBM Technical Disclosure Bulletin for Power Savings Mode for Serial Links, Document No. 92A 63543// RO8910839, PubNo=344, Dec. 1992 (1 page).

*Primary Examiner*—Glenn Auve

(57) ABSTRACT

A method and apparatus for interfacing a computer system with another system is described including an interface circuit. The interface circuit detects if the voltage level on a signal line represents a valid logic level and if so, provides a valid signal in response. The valid signal allows the computer system to which the interface circuit is coupled to provide power to the interface circuit such that network communication may be established and the interface circuit can internally turn on and off sections of its circuitry without intervention or control by the computer system. In addition, the computer system can use the Invalid signal to control software and/or to notify the user of the status of the computer system. When the interface circuit detects that the voltage level on the signal line does not represent a valid logic level, an Invalid signal is provided allowing the application of power to certain portions of the interface circuit to be suspended so that overall power consumption by the computer system is reduced.

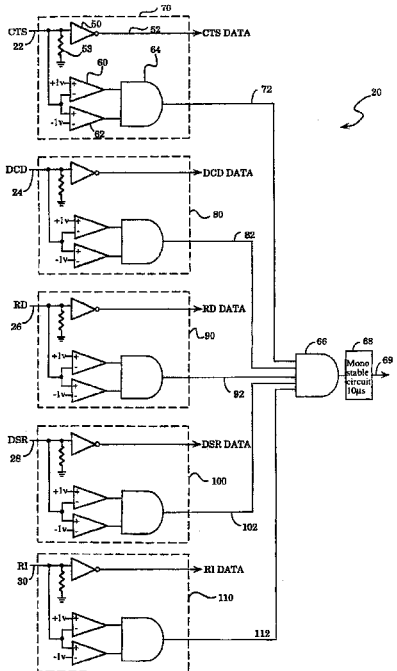

US 5,649,210 C1

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1–18, 20–25, and 27 is confirmed.

Claims 19 and 26 are determined to be patentable as amended.

New claims 28–118 are added and determined to be patentable.

19. The communications interface circuit as set forth in claim [11] *12*, wherein:
said first and second levels are voltage levels.
26. The method as set forth in claim [20] *22*, wherein:
said first and second levels are voltage levels.
28. *The communications interface circuit as set forth in claim 2, wherein said first level is a positive voltage.*
29. *The communications interface circuit as set forth in claim 28, wherein said second level is a negative voltage.*
30. *The communications interface circuit as set forth in claim 1, wherein said means for detecting the presence of said signal is configured for coupling to an RS-232 line of an RS-232 communications interface.*
31. *The communications interface circuit as set forth in claim 30, wherein said RS-232 line is a Clear to Send line.*
32. *The communications interface circuit as set forth in claim 30, wherein said RS-232 line is a Carrier Detect line.*
33. *The communications interface circuit as set forth in claim 30, wherein said RS-232 line is a Receive Data line.*
34. *The communications interface circuit as set forth in claim 30, wherein said RS-232 line is a Data Set Ready line.*
35. *The communications interface circuit as set forth in claim 30, wherein said RS-232 line is a Ring Indicator line.*
36. *The communications interface circuit as set forth in claim 1, wherein said Stabilized Master Invalid signal controls power consumption of the communications interface circuit.*
37. *The communications interface circuit as set forth in claim 1, wherein an application of power to certain portions of the communications interface circuit is suspended when said Stabilized Master Invalid signal is asserted.*
38. *The communications interface circuit as set forth in claim 30, wherein said Stabilized Master Invalid signal controls power consumption of the communications interface circuit.*
39. *The communications interface circuit as set forth in claim 30, wherein an application of power to certain portions of the communications interface circuit is suspended when said Stabilized Master Invalid signal is asserted.*
40. *The communications interface circuit as set forth in claim 5, wherein said first level is a positive voltage.*
41. *The communications interface circuit as set forth in claim 40, wherein said second level is a negative voltage.*
42. *The communications interface circuit as set forth in claim 5, wherein said means for detecting the presence of said signal and said second means for detecting the presence of said second signal are configured for coupling to at least two RS-232 lines of an RS-232 communications interface.*
43. *The communications interface circuit as set forth in claim 42, wherein each of said at least two RS-232 lines corresponds to one of a Clear to Send line, a Carrier Detect line, a Receive Data line, a Data Set Ready line, and a Ring Indicator line.*
44. *The communications interface circuit as set forth in claim 5, wherein said Stabilized Master Invalid signal controls power consumption of the communications interface circuit.*
45. *The communications interface circuit as set forth in claim 5, wherein an application of power to certain portions of the communications interface circuit is suspended when said Stabilized Master Invalid signal is asserted.*
46. *The communications interface circuit as set forth in claim 43, wherein said Stabilized Master Invalid signal controls power consumption of the communications interface circuit.*
47. *The communications interface circuit as set forth in claim 42, wherein an application of power to certain portions of the communications interface circuit is suspended when said Stabilized Master Invalid signal is asserted.*
48. *The communications interface circuit as set forth in claim 12, wherein said first level is a positive voltage.*
49. *The communications interface circuit as set forth in claim 48, wherein said second level is a negative voltage.*
50. *The communications interface circuit as set forth in claim 11, wherein said Invalid signal detection circuit is configured for coupling to a RS-232 line of an RS-232 communications interface.*
51. *The communications interface circuit as set forth in claim 50, wherein said RS-232 line is a Clear to Send line.*
52. *The communications interface circuit as set forth in claim 50, wherein said RS-232 line is a Carrier Detect line.*
53. *The communications interface circuit as set forth in claim 50, wherein said RS-232 line is a Receive Data line.*
54. *The communications interface circuit as set forth in claim 50, wherein said RS-232 line is a Data Set Ready line.*
55. *The communications interface circuit as set forth in claim 50, wherein said RS-232 line is a Ring Indicator line.*
56. *The communications interface circuit as set forth in claim 11, wherein said Stabilized Master Invalid signal controls power consumption of the communications interface circuit.*
57. *The communications interface circuit as set forth in claim 11, wherein an application of power to certain portions of the communications interface circuit is suspended when said Stabilized Master Invalid signal is asserted.*
58. *The communications interface circuit as set forth in claim 50, wherein said Stabilized Master Invalid signal controls power consumption of the communications interface circuit.*
59. *The communications interface circuit as set forth in claim 50, wherein an application of power to certain portions of the communications interface circuit is suspended when said Stabilized Master Invalid signal is asserted.*
60. *The communications interface circuit as set forth in claim 15, wherein said first level is a positive voltage.*
61. *The communications interface circuit as set forth in claim 60, wherein said second level is a negative voltage.*
62. *The communications interface circuit as set forth in claim 15, wherein said Invalid signal detect circuit and said second Invalid signal detection circuit are coupled to different RS-232 lines of an RS-232 communications interface.*
63. *The communications interface circuit as set forth in claim 62, wherein said RS-232 lines includes a Clear to Send line, a Carrier Detect line, a Data Set Ready line, or a Ring Indicator line.*

64. The communications interface circuit as set forth in claim 15, wherein said Stabilized Master Invalid signal controls power consumption of the communications interface circuit.

65. The communications interface circuit as set forth in claim 15, wherein an application of power to certain portions of the communications interface circuit is suspended when said Stabilized Master Invalid signal is asserted.

66. The communications interface circuit as set forth in claim 63, wherein said Stabilized Master Invalid signal controls power consumption of the communications interface circuit.

67. The communications interface circuit as set forth in claim 62, wherein an application of power to certain portions of the communications interface circuit is suspended when said Stabilized Master Invalid signal is asserted.

68. The method as set forth in claim 22, wherein said first level is a positive voltage.

69. The method as set forth in claim 68, wherein said second level is a negative voltage.

70. The method as set forth in claim 21, wherein step a) comprises detecting the presence of said signal on an RS-232 line of an RS-232 communications interface that is at a level associated with said Invalid logic signal.

71. The method as set forth in claim 70, wherein said RS-232 line is a Clear to Send line.

72. The method as set forth in claim 70, wherein said RS-232 line is a Carrier Detect line.

73. The method as set forth in claim 70, wherein said RS-232 line is a Receive Data line.

74. The method as set forth in claim 70, wherein said RS-232 line is a Data Set Ready line.

75. The method as set forth in claim 70, wherein said RS-232 line is a Ring Indicator line.

76. The method as set forth in claim 21, further comprising: using said Stabilized Master Invalid signal to control power consumption of the communications interface circuit.

77. The method as set forth in claim 21, further comprising: suspending an application of power to certain portions of the communications interface circuit when said Stabilized Master Invalid signal is asserted.

78. The method as set forth in claim 70, further comprising: using said Stabilized Master Invalid signal to control power consumption of the communications interface circuit.

79. The method as set forth in claim 70, further comprising: suspending an application of power to certain portions of the communications interface circuit when said Stabilized Master Invalid signal is asserted.

80. The method as set forth in claim 24, wherein said first level is a positive voltage.

81. The method as set forth in claim 80, wherein said second level is a negative voltage.

82. The method as set forth in claim 24, wherein steps a) and d) comprise detecting the presence of said signal on a first RS-232 line of an RS-232 communications interface that is at a level associated with said Invalid logic signal and detemining the presence of said second signal having a level associated with said Invalid logic signal on a second RS-232 line of said RS-232 communication interface.

83. The method as set forth in claim 82, wherein said first and second RS-232 lines include a Clear to Send line, a Carrier Detect line, a Receive Data line, a Data Set Ready line, and a Ring Indicator line.

84. The method as set forth in claim 24, further comprising: using said Stabilized Master Invalid signal to control power consumption of the communications interface circuit.

85. The method as set forth in claim 24, further comprising: suspending an application of power to certain portions of the communications interface circuit when said Stabilized Master Invalid signal is asserted.

86. The method as set forth in claim 83, further comprising: using said Stabilized Master Invalid signal to control power consumption of the communications interface circuit.

87. The method as set forth in claim 82, further comprising: suspending an application of power to certain portions of the communications interface circuit when said Stabilized Master Invalid signal is asserted.

88. A communications interface circuit comprising:
   first circuitry to detect the presence of a signal that is at a level associated with an invalid logic signal on a plurality of itnerface lines;
   second circuitry to provide a master invalid signal in response to said first circuitry, said master invalid signal being asserted if a signal that is at said level associated with said invalid logic signal is detected on each of said plurality of interface lines; and
   third circuitry to generate a stabilized master invalid signal in response to said second circuitry, said stabilized master invalid signal being (i) asserted if said master invalid signal remains asserted for a predetermined period of time and (ii) deasserted if said master invalid signal remains asserted for less than said predetermined period of time.

89. The communications interface circuit as set forth in claim 88, wherein said level associated with said invalid logic signal is a voltage that is less positive than positive three volts and more negative than negative three volts.

90. The communications interface circuit as set forth in claim 88, wherein said first circuitry comprises a comparator for each of said plurality of interface lines, each comparator comprising;
   a first circuit to determine the presence of said signal having a voltage that is below a first voltage level; and
   a second circuit to determine the presence of said signal having a voltage that is above a second voltage level.

91. The communications interface circuit as set forth in claim 90, wherein said first voltage level is a positive voltage and said second voltage level is a negative voltage.

92. The communications interface circuit as set forth in claim 90, wherein said comparator further comprises an AND gate to provide a single line invalid signal in response to said first circuit and said second circuit.

93. The communications interface circuit as set forth in claim 88, wherein said plurality of interface lines include an RS-232 data line and at least one RS-232 control line.

94. The communications interface circuit as set forth in claim 93, wherein said at least one RS-232 control line includes at least one of a Clear to Send line, a Carrier Detect line, a Data Set Ready line and a Ring Indicator line.

95. The communications interface circuit as set forth in claim 88, wherein said plurality of interface lines comprises at least two RS-232 control lines from a plurality of RS-232 lines including a Clear to Send line, a Carrier Detect line, a Data Set Ready line and a Ring Indicator line.

96. The communications interface circuit as set forth in claim 88, wherein said stabilized master invalid signal controls power consumption of the communications interface circuit.

97. The communications interface circuit as set forth in claim 88, wherein an application of power to certain portions of the communications interface circuit is suspended when said stabilized master invalid signal is asserted.

98. The communications interface circuit as set forth in claim 93, wherein said stabilized master invalid signal controls power consumption of the communications interface circuit.

99. The communications interface circuit as set forth in claim 93, wherein an application of power to certain portions of the communications interface circuit is suspended when said stabilized master invalid signal is asserted.

100. A communications interface circuit comprising;

a first circuit detecting the presence of a signal that is at a level associated with an invalid logic signal on each of a plurality of interface lines, said invalid logic level signal being a signal at a voltage that is less positive than a positive threshold voltage or less negative than a negative threshold voltage;

a second circuit, in response to said first circuit, providing a master invalid signal, and placing said master invalid signal into an invalid state if said first circuit detects an invalid logic level signal on each of said plurality of interface lines; and a third circuit, in response to said second circuit, generating a stabilized master invalid signal, said stabilized master invalid signal is (i) asserted if said master invalid signal remains in said invalid state for a predetermined period of time, and (ii) deasserted if said master invalid signal remains in said invalid state for less than said predetermined period of time.

101. The communications interface circuit as set forth in claim 100, wherein said second circuit places said master invalid signal into a valid state if said first circuit detects a valid logic level signal on one or more of said plurality of interface lines.

102. The communications interface circuit as set forth in claim 100, wherein said plurality of interface lines are configured as RS-232 lines of an RS-232 communications interface.

103. The communications interface circuit as set forth in claim 100, wherein said positive threshold voltage is more positive than positive one volt.

104. The communications interface circuit as set forth in claim 103, wherein said negative threshold voltage is less negative than negative one volt.

105. The communications interface circuit as set forth in claim 100, wherein said plurality of interface lines are RS-232 lines including a Clear to Send line, a Carrier Detect line, a Receive Data line, a Data Set Ready line and a Ring Indicator line.

106. The communications interface circuit as set forth in claim 100, wherein said stabilized master invalid signal controls power consumption of the communications interface circuit.

107. The communications interface circuit as set forth in claim 100, wherein an application of power to certain portions of the communications interface circuit is suspended when said stabilized master invalid signal is asserted.

108. The communications interface circuit as set forth in claim 105, wherein said stabilized master invalid signal controls power consumption of the communications interface circuit.

109. The communications interface circuit as set forth in claim 105, wherein an application of power to certain portions of the communications interface circuit is suspended when said stabilized master invalid signal is asserted.

110. A communications interface circuit comprising;

a first circuit to detect the presence of a signal that is at a level associated with an invalid logic signal on a plurality of interface lines;

circuitry to provide a master invalid signal in response to detecting the presence of said signal having said invalid logic signal level on said plurality of interface lines, said master invalid signal being asserted if said first circuit detects a signal having said invalid logic signal level on each of said plurality of interface lines; and a second circuit to generate a stabilized master invalid signal in response to providing said master invalid signal, said stabilized master invalid signal being (i) asserted if said master invalid signal remains at said invalid logic signal level for a predetermined period of time and (ii) deasserted if said master invalid signal remains at said invalid logic signal level for less than said predetermined period of time.

111. The communications interface circuit as set forth in claim 110, wherein said level associated with said invalid logic signal is less positive than positive three volts and more negative than negative three volts.

112. The communications interface circuit as set forth in claim 110, wherein each of said plurality of interface lines is an RS-232 line.

113. The communications interface circuit as set forth in claim 112, wherein said first circuit is coupled to an RS-232 data line and at least one RS-232 control line of said plurality said RS-232 lines.

114. The communications interface circuit as set forth in claim 113, wherein said at least one RS-232 control line includes at least one of a Clear to Send line, a Carrier Detect line, a Data Set Ready line and a Ring Indicator line.

115. The communications interface circuit as set forth in claim 110, wherein said stabilized master invalid signal controls power consumption of the communications interface circuit.

116. The communications interface circuit as set forth in claim 110, wherein an application of power to certain portions of the communications interface circuit is suspended when said stabilized master invalid signal is asserted.

117. The communications interface circuit as set forth in claim 112, wherein said stabilized master invalid signal controls power consumption of the communications interface circuit.

118. The communications interface circuit as set forth in claim 112, wherein an application of power to certain portions of the communications interface circuit is suspended when said stabilized master invalid signal is asserted.

* * * * *